Jan. 29, 1946.    J. C. TRAVILLA, JR    2,393,722
RAILWAY TRUCK STRUCTURE
Filed Jan. 28, 1944

INVENTOR;
JAMES C. TRAVILLA JR.
BY Rodney Bedell
ATTORNEY

Patented Jan. 29, 1946

2,393,722

UNITED STATES PATENT OFFICE 2,393,722

RAILWAY TRUCK STRUCTURE

James C. Travilla, Jr., Swarthmore, Pa., assignor to General Steel Castings Corporation, Granite City, Ill., a corporation of Delaware Application January 28, 1944, Serial No. 520,001

4 Claims. (Cl. 105—195)

The invention relates to railway rolling stock and consists in a truck structure and more particularly in the spring support of the truck frame.

The main object of the invention is to provide for easy spring action when the vehicle is unloaded or is lightly loaded and to provide increased spring capacity under a heavier load or under greater spring compression. This object is attained by associating a spring snubber with a portion of the spring structure and providing for the functioning of the snubber during a portion only of the spring action.

Another object is to group a free acting spring and a spring which is snubbed, at least during a portion of its movement, so that their combined action will be best adapted for the distribution of their load to their support. More particularly it is desired to dispose a free acting spring and a spring which is snubbed, at least during a portion of its movement, along an equalizer bar extending between truck axles so as to effectively prevent bouncing of the vehicle without snubbing the equalizer movement. This feature is particularly desirable in a six-wheel truck in which the load applied to one spring group is distributed unequally to the adjacent axles and the object is attained by positioning the free acting spring nearer the axle which receives the greater portion of the load and positioning the snubbed spring nearer to the other axle.

These and other detail objects are attained by the structure illustrated in the accompanying drawing, in which—

Figure 1:
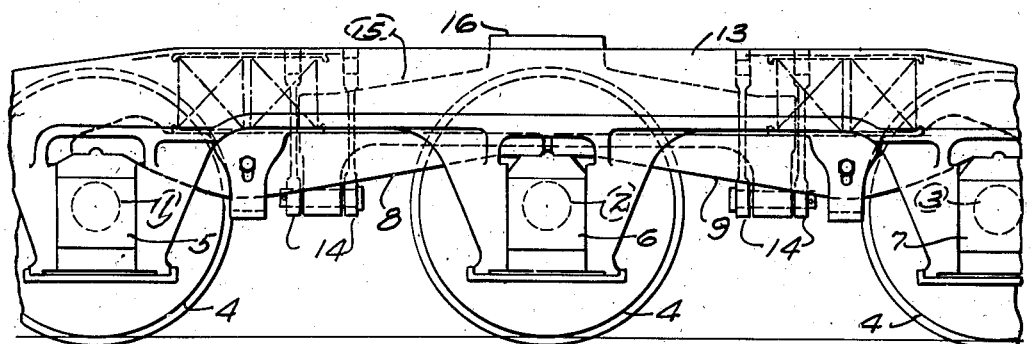
Figure 1 is a side elevation of a six-wheel truck and shows the general arrangement of the springs and associated parts.

The truck includes three spaced axles 1, 2 and 3, including wheels 4 mounted thereon and carrying journal boxes 5, 6 and 7. Equalizers 8 and 9 extend between adjacent journal boxes at the same side of the truck and each equalizer is provided with a saddle 10 for a group of spring units 11 and 12 upon which the truck frame wheel piece 13 is mounted. Preferably the wheel piece is of inverted U section and houses the spring units 11 and 12. Swing hangers 14 are pivotally suspended from the truck frame and support the double bolster 15 provided with the usual center plate 16 upon which the vehicle body (not shown) is mounted. This general arrangement is well known in the art and the novel features reside in the spring arrangement detailed in Figures 2 and 3.

Spring unit 11 comprises a series of coil springs 17, 18 and 19 of different rod diameters and different coil diameters, the smaller springs being placed inside the larger springs as is customary in railway truck springs. Spring unit 12 comprises a coil spring 20, corresponding to spring 17, but instead of the inner coil springs 18 and 19, there is provided a friction snubbing device including telescoping parts 21, 22, 23 arranged one above the other, the intermediate part 22 constituting a wedge between parts 21, 23. A helical spring tends to thrust parts 22 and 24 apart. A bolt 25 limits such relative movement of the parts and determines the height of the snubber when it is inactive. An adapter 26 forms an upward extension of part 23 and could be integral therewith except for the desirability of adjusting the effective height of the snubber by substitution of adapters of different depth.

The over all height of the snubber may be less than the distance between the equalizer and frame and the snubber will not function at all times, as explained below, and a relatively light spring 27 is compressed between a seat on the snubber and the truck frame and holds the adapter to its seat on the snubber and the snubber on its seat to the equalizer.

Figure 2:
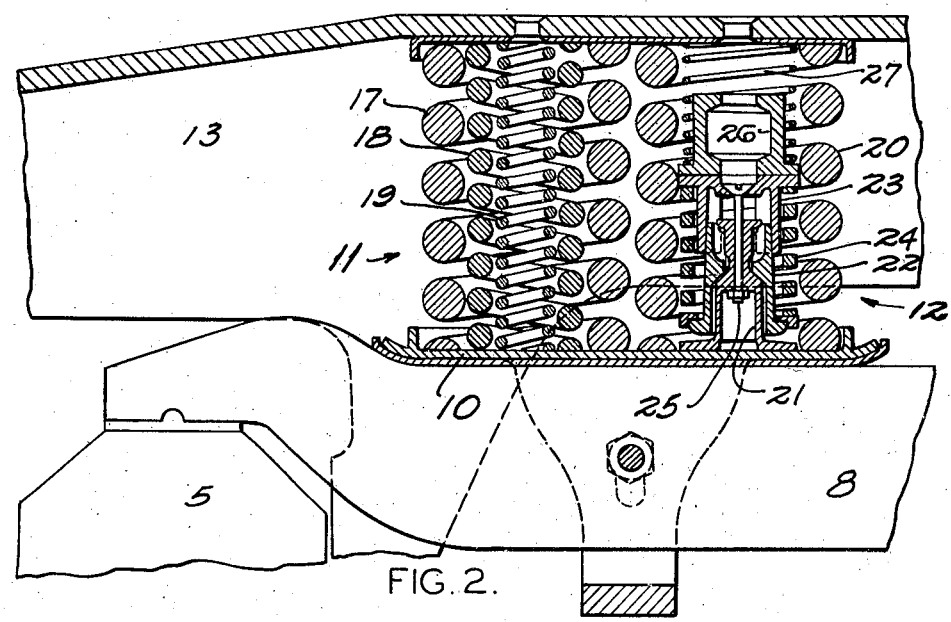
Figure 2 is a vertical section through one of the groups of springs, shown in Figure 1, and the associated parts, the section extending longitudinally of the truck and being drawn to an enlarged scale. The group includes a free acting spring and a spring provided with a snubber but the parts are shown in a position in which the snubber is not functioning.

The springs are so designed that when the vehicle body is empty and stationary, the springs will be expanded, with their height as shown in Figure 2, and the top of adapter 26 spaced from the opposing face of the top wall of wheel piece 13, in which position the snubber does not function. The height of the springs under such conditions may be termed their "normal light load" height. In other words, the springs are carrying only the weight of the truck parts which they support and the vehicle body.

Figure 3:
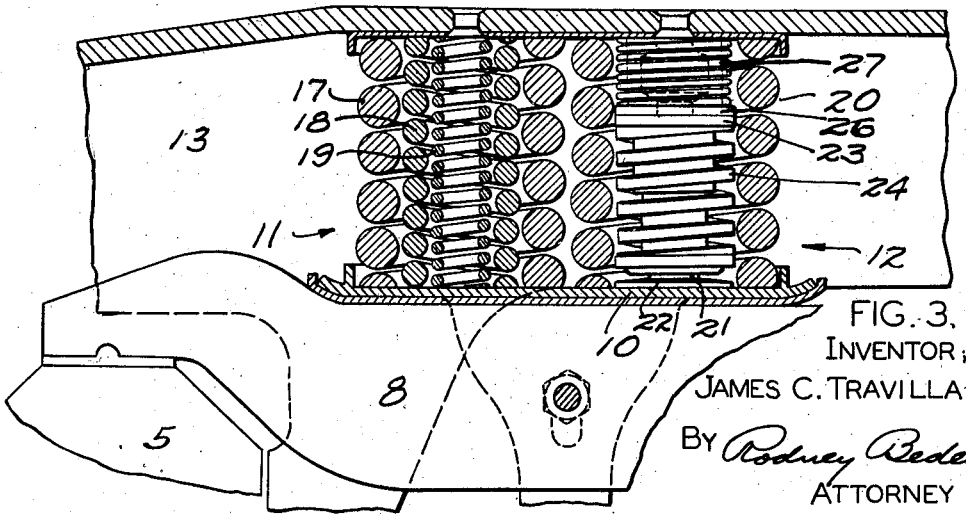
Figure 3 is a similar section showing the parts in the position assumed when the springs, and particularly the right hand spring, have been compressed to an extent at which the snubber would begin to function upon further compression of the springs.

The springs are so designed that when the vehicle body is loaded to its full capacity and is stationary, the springs will be compressed until their height is as shown in Figure 3, in which the horizontal top wall of the wheel piece contacts adapter 26. In other words, the springs are carrying the weight of the truck parts which they support, the vehicle body and the capacity lading of the latter. The height of the springs under such conditions may be termed their "normal full load" height.

The snubber is so designed that it will not function until the spring with which it is associated is further compressed. Such further compression of the spring, and resulting reduction in its height, may result irrespective of the vehicle load during operation of the vehicle.

When the vehicle is travelling along the track, the body roll, particularly when the vehicle is rounding a curve, and irregularities in the track cause vertical movement of the vehicle body and truck frame relative to the wheels and axles, thus applying shocks to the springs and causing the springs to alternately compress and expand in relation to their normal heights under given loads, such as their full load height or their light load heights. When the vehicle is empty or is loaded less than its full capacity, it is desirable to permit the springs to act freely to provide for smooth easy riding because the shocks which cause spring oscillations are not as great as when the vehicle is fully loaded. For this reason, it is not desirable to snub the action of the springs at their heights when the vehicle is empty and when it is loaded less than its full capacity because such snubbing action at these heights would tend to wear out the snubber. When the vehicle is fully loaded, however, it is desirable to snub the action of the springs when they are being compressed a greater amount due to increased shocks applied to them because there is a greater possibility of synchronization of rail joint impacts with the natural frequency of the springs, the natural frequency of the spring varying inversely as its load is increased, and due to synchronization of such impacts and spring frequency, the rebounds of the springs would then be much greater than they would be when the vehicle is lightly loaded, likely causing severe bouncing action of the vehicle body and its load.

By having the snubber active from the full loaded height of spring to the solid height, the spring capacity in that range is increased due to the snubber spring thereby tending to prevent the springs from going solid, and when the height of the springs is between full load height and light load height the snubber is not active, thus providing flexible spring action.

When the springs have compressed sufficiently to bring adapter 26 and the top wall of wheel piece 13 into contact (i. e., when the springs are compressed to "full load height"), the snubber begins to offer frictional resistance to further compression of the springs, and particularly of spring 20, and the greater the compression the greater the resistance. Similarly, as a result of the spring compressing force being absorbed at least partially by the snubber, too rapid rebound is prevented as the parts return to their normal position. When the wheel piece and equalizer have moved away from each other to the extent that the spring height is greater than its "full load" height, the top of the wheel piece and the adapter are separated from each other and further spring expansion is unaffected by the snubber. Accordingly, the springs will react in a manner whereby the truck possesses good riding qualities irrespective of the body load.

Spring units 11 and 12 form a group, the center of which is preferably one-third of the distance between axle 1 and axle 2, and the free acting spring unit 11 is positioned nearer to axle 1 and the snubbed spring unit 12 is positioned nearer to axle 2. The minimum movement of the equalizer would be approximately midway between axles 1 and 2 and the snubbed spring unit is fairly close to this point. When the snubber is functioning, both spring units are loaded substantially equally but the frictional resistance to their action is applied to the unit nearer the midpoint between their axles than would be the case if both spring units included snubbers. Accordingly, bouncing action of the frame as a whole is resisted while the pivotal action of the equalizer about its center is not unduly restricted. This positioning of the group of springs relative to the axles and the positioning of the snubber-associated spring in the spring group contributes to the good riding characteristics of the truck.

The above description relates to the preferred embodiment of the invention illustrated, but it is to be understood that other arrangements may embody different features of the invention. Other types of snubbers could be substituted for that shown. The feature of the snubber operating approximately only during the movement of the frame-supporting spring between its normal full load height and its solid height may be provided in the other spring supporting the truck frame instead of in the spring nearer the middle axle. If desired, each supporting spring may have a snubber functioning in the specified manner associated therewith, or the frame might be supported by a single spring with a snubber arranged as described. In some trucks it may be preferable to space one or both springs, with snubber or snubbers functioning as described, at proportionate distances between the axles other than that shown.

Other variations in detail may be made without departing from the general arrangement, and the exclusive use of those modifications coming within the scope of the claims is contemplated.

What is claimed is:

1. In a railway vehicle truck, two spaced wheeled axles, structure extending between said axles and supported therefrom, a truck frame including a wheel piece and yielding units supporting said wheel piece from said structure, one of said units being nearer to one of said axles than to the other axle and the other unit being approximately equi-distant from the axles, the first-mentioned unit comprising a substantially free acting spring, and the other unit comprising a spring having a snubber associated therewith but functioning only during action of the spring between approximately its normal full load height and its solid height.

2. In a railway vehicle truck, three wheeled axles spaced apart longitudinally of the truck and provided with journal boxes and equalizers, each equalizer being supported at one end upon a journal box on one of the end axles and at its other end upon a journal box on the middle axle, a truck frame including a wheel piece extending over said equalizer, and a series of yielding units supporting said wheel piece from each of said equalizers, one of said units being nearer to its supporting journal box on the end axle than to the middle axle and being free acting at all times, and the other unit being approximately equi-distant between its supporting boxes and having a snubber associated therewith.

3. A structure as described in claim 2 in which the snubber comprises parts held assembled with each other and having operative engagement with the wheel piece and supporting equalizer separate from the associated yielding unit, whereby the latter is replaceable independently of the snubber.

4. A truck construction as described in claim 1 in which the snubber is complete independently of the springs and has operative engagement with its supporting equalizer and the wheel piece independently of the springs, whereby the springs may be replaced without disassembling the snubber.

JAMES C. TRAVILLA, JR.